United States Patent

Larsson et al.

Patent Number: 5,679,250
Date of Patent: Oct. 21, 1997

[54] PRESSURIZED SCREEN ARRANGEMENT

[75] Inventors: Pär-Erik Larsson, Barueri-SP, Brazil; Thomas Lindenau, Alnö, Sweden

[73] Assignee: Sunds Defibrator Industries Aktiebolag, Sweden

[21] Appl. No.: 500,928

[22] PCT Filed: Jan. 12, 1994

[86] PCT No.: PCT/SE94/00013

§ 371 Date: Aug. 7, 1995

§ 102(e) Date: Aug. 7, 1995

[87] PCT Pub. No.: WO94/18387

PCT Pub. Date: Aug. 18, 1994

[30] Foreign Application Priority Data

Feb. 10, 1993 [SE] Sweden ................................. 9300419

[51] Int. Cl.⁶ .............................. B07B 1/20; B01D 29/35; B01D 29/86
[52] U.S. Cl. .................. 240/415; 210/450; 210/497.01; 209/273; 209/306; 209/406
[58] Field of Search ........................ 210/497.01, 415, 210/232, 238, 413, 414, 450; 209/273, 306, 405, 406; 162/55

[56] References Cited

U.S. PATENT DOCUMENTS

| 3,034,650 | 5/1962 | Szepan . |
| 3,700,110 | 10/1972 | Engalitcheff . |
| 3,786,918 | 1/1974 | Holz . |
| 3,953,325 | 4/1976 | Nelson . |
| 4,017,387 | 4/1977 | Hatton . |
| 4,188,286 | 2/1980 | Holz . |
| 4,252,641 | 2/1981 | Martin . |
| 4,410,424 | 10/1983 | Chupka . |
| 4,507,201 | 3/1985 | Wall . |
| 4,846,971 | 7/1989 | Lamort . |
| 5,271,837 | 12/1993 | Discepolo . |
| 5,326,470 | 7/1994 | Shaw . |

FOREIGN PATENT DOCUMENTS

WO9005807 3/1990 WIPO .

*Primary Examiner*—Thomas M. Lithgow
*Attorney, Agent, or Firm*—Lerner, David, Littenberg, Krumholz & Mentlik

[57] ABSTRACT

A pressurized screen arrangement for screening lignocellulose containing fiber material, comprising a screen housing (10) with a screen cage (11) are arranged in first and, respectively, second attachment members (17, 18) in the screen housing. Both ends of the screen cage (11) are fitted into the attachment members (17,18) with radial clearance, and an axial support (21) is provided at least at one of the attachment members (17,18).

6 Claims, 2 Drawing Sheets

PRESSURIZED SCREEN ARRANGEMENT

FIELD OF THE INVENTION

The present invention relates to a pressurized screen arrangement for the screening of lignocellulose-containing fibrous material, preferably in the form of a pulp suspension.

BACKGROUND OF THE INVENTION

A pressurized screen normally comprises three main parts, namely a screen housing, a screen cage, and a rotor. The screen cage is intended to act as a barrier for coarse material, while the fibers are allowed to pass through the screen apertures. The screen cage can be constructed, for example, of a perforated or slotted plate with a smooth or corrugated surface. Alternatively, the screen cage can be formed from spaced rods, through which the fibers, but not the impurities, can pass. It is, of course, essential that in order to obtain appropriate screening results, shortcircuiting be prevented, i.e. that unscreened material is not mixed with screened material A conventional method of mounting the screen cage in the screen housing is to form rings at the ends of the screen cage. These rings have conical surfaces, which are fitted into corresponding conical seats in flanges in the screen housing. These conical surfaces, in combination with axial prestressing, create significant limitations on the potential radial motion (translation) and tangential angular movement (rotational) of the end portions of the screen cage.

In order to prevent clogging of the screen cage, a rotor which produces suction and pressure pulses is used. These pulses create radially directed forces along the circumference of the screen cage. These forces cause a statically determined radial movement of the shell surface of the screen cage. Owing to the aforementioned prestressing, however, the end portions of the screen cage cannot be moved in this manner. Due to their design, the end portions are thus forced to assume a shape determined by the conical rings fitted into the conical seats. This deformation at the end portions causes stresses in the material itself. These stresses are secondary by nature, but due to the dynamic character of the load, they are totally decisive in determining the service life of the screen cage. The size of these forces depends on various factors, such as the rotor design, the consistency of the fibrous material, etc.

SUMMARY OF THE INVENTION

In accordance with the present invention, these and other objects have now been accomplished by the invention of apparatus for screening lignocellulose-containing fibrous material comprising a housing, a screen cage mounted in the housing, the screen cage having a first end and a second end, a rotor mounted within the screen cage, the housing including first attachment means at a first end of the screen cage and second attachment means at a second end of the screen cage, mounting means for mounting the first end of the screen cage on the first attachment means while providing radial clearance therebetween so as to permit radial motion of the screen cage at the first attachment means and for mounting the second end of the screen cage on the second attachment means while providing radial clearance therebetween so to permit radial motion of the screen cage at the second attachment means, and axial support means for axially supporting at least one of the first and second attachment means.

In accordance with one embodiment of the apparatus of the present invention, the apparatus includes rotation prevention means extending between at least one of the first and second attachment means and the screen cage for preventing rotation of the screen cage within the housing.

In accordance with another embodiment of the apparatus of the present invention, the screen cage comprises a perforated or slotted plate. In another embodiment the screen cage comprises a plurality of rods, and includes a plurality of support strips extending around those rods.

In accordance with another embodiment of the apparatus of the present invention, the apparatus includes separate seal means provided in the radial clearance between the first and second attachment means and the first and second ends of the screen cage. Preferably, the first and second ends of the screen cage include groove means, and the seal means are provided in those groove means.

In accordance with the present invention, stresses in the end portions of the screen cage are now eliminated by the provision of radial clearance between the screen cage and attachment members of the screen housing. In this manner, it is made possible for the end portions of the screen cage to move freely.

BRIEF DESCRIPTION OF THE DRAWINGS

The present invention can be more fully understood with reference to the following detailed description, which in turn refers to the drawings in which.

DETAILED DESCRIPTION

Figure 1:
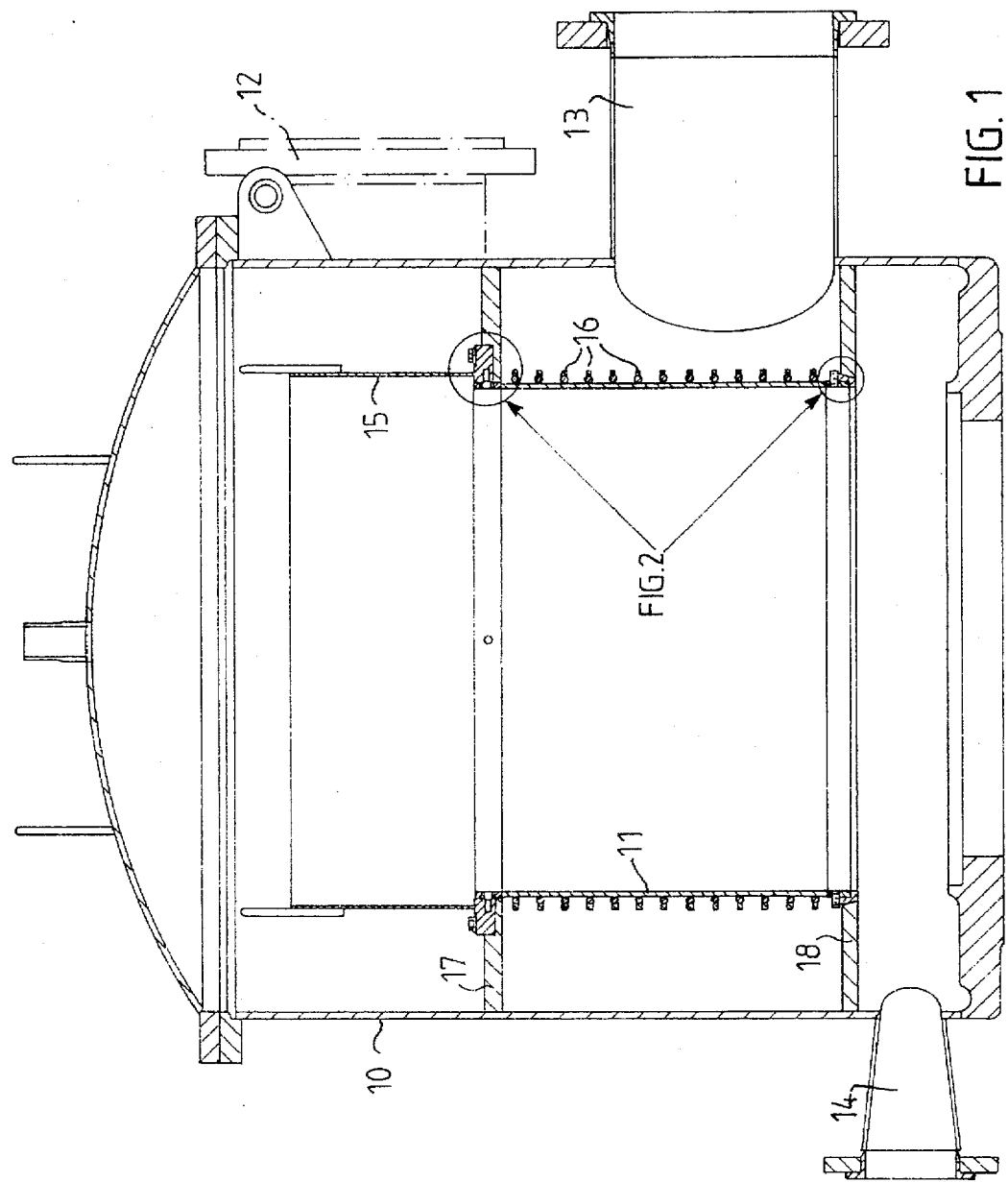
FIG. 1 is a side, elevational, cross-sectional view of a pressurized screen arrangement according to the present invention.
Figure 2:
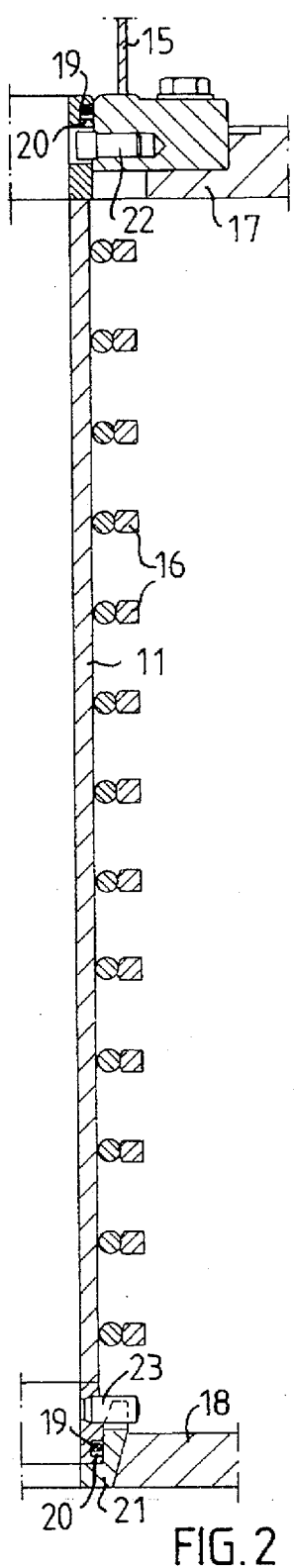
FIG. 2 is an exploded, partial view of the upper and lower attachment members of the screen cage shown in FIG. 1.
Figure 4:
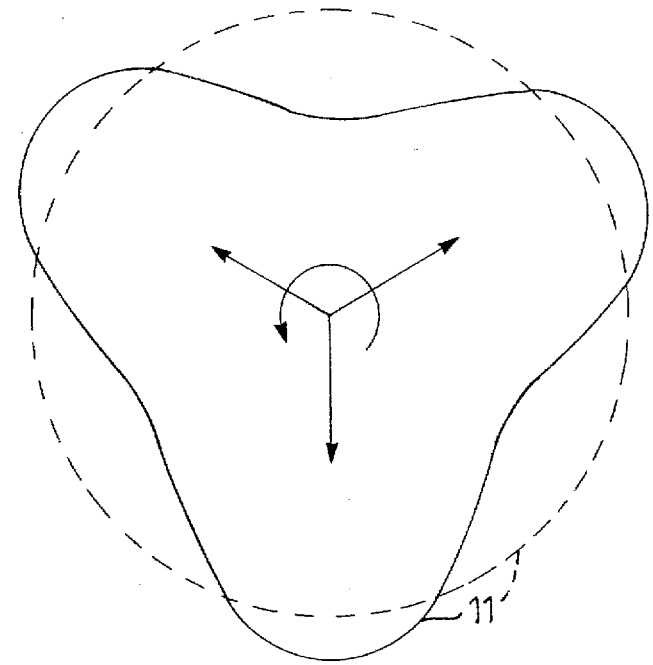
FIG. 4 is a top, schematic representation of the deformation of the screen cage in an operation due to the rotational forces in accordance with the present invention.
Figure 3:
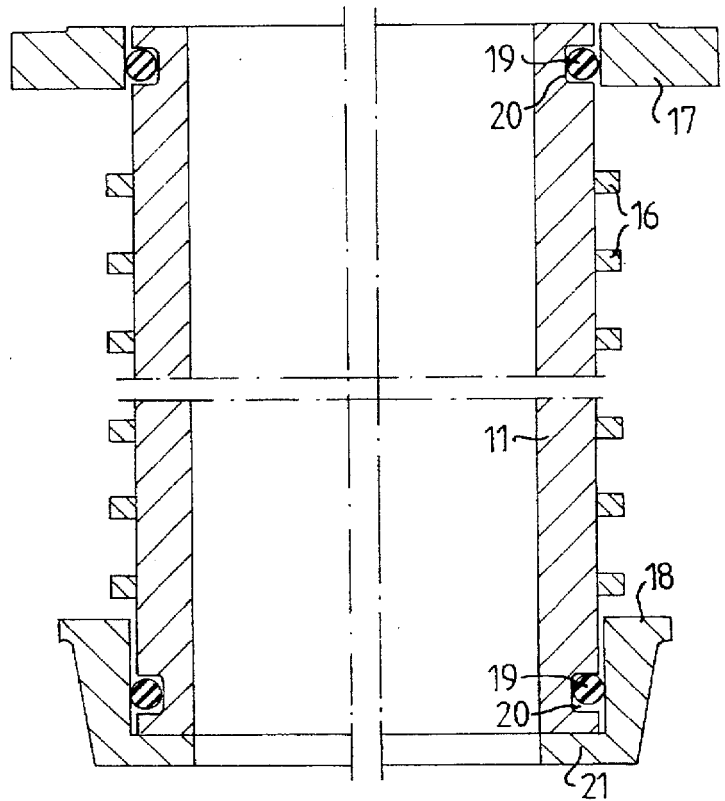
FIG. 3 is a side view, partially schematic in nature, showing the principle of attachment according to the present invention.

The pressurized screen arrangement shown in FIG. 1 comprises a vertical screen housing 10 containing a screen cage 11. To the housing 10 are connected an inlet 12 for the pulp suspension, an outlet 13 for accept, i.e. pulp containing fibers which have passed through the apertures of the screen cage, and an outlet 14 for reject, i.e. coarse material which could not pass through the apertures of the screen cage. In the screen housing 10, on the inside of the screen cage 11, a rotor (not shown) is located in order to produce in the pulp suspension the suction and pressure pulses which are required for the screening. The rotor is of a design such that the radially directed rotational forces caused by the suction and pressure pulses balance each other out in the radial direction. This implies that the screen cage is self-supporting with regard to radial forces.

The pressurized screen shown in FIG. 1 is provided with a coarse screen plate 15 in the upper portion of the screen housing 10 in connection to the inlet 12. This coarse screen plate 15 is intended to separate scrap and the like at the inlet to the screen housing.

The screen cage shown in the drawings is constructed of rods, and on its exterior is provided with a number of supporting strips 16 extending about its entire circumference. The screen housing 10 is provided with first and second attachment members 17 and 18, respectively, for the screen cage 11. These attachment members are formed with flanges, which also separate the pulp inlet portion (inject portion) of the screen housing from the accept portion and, respectively, the accept portion from the reject portion. Attachment of the ends of the screen cage 11 on the attachment members 17 and 18 has the object both of holding the screen cage and of preventing shortcircuiting between unscreened material (inject and reject) and screened material (accept).

Fastening of the screen cage 11 on the attachment members 17 and 18 is formed so that both ends of the screen cage are fitted into the attachment members 17, 18 with a radial clearance. In the resulting gap between the screen cage and attachment members a separate seal 19 preferably extends all about the screen cage. This seal can be placed in a groove 20 at each end of the screen cage 11.

The radial clearance is thus well defined, and has a size which is sufficient to prevent deformations caused by pulsating forces which arise during the screening process. The clearance, however, shall not be greater than that which is required to ensure that satisfactory sealing can be maintained.

As the screen cage 11 is self-supporting, only axial fixation is required, which is achieved by means of an axial support 21 at the second attachment member 18. This second attachment member 18 preferably should be the lower one in the case of a vertical screen. In order to prevent rotation of the screen cage 11, a number of rotation stopping members 22 and 23, such as radial pins, are located between the attachment members 17 and 18, and the ends of the screen cage 11.

By means of this arrangement, the stress level in the screen cage 11 can be lowered and can therefore be used for material reduction. Alternatively, the possibility of a higher load can be utilized for increasing the screen capacity. The dimensioning stress conditions consist only of the statically determined tangential stresses. These stresses can also be predetermined in a safer way.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

We claim:

1. Apparatus for the screening of lignocellulose-containing fibrous material comprising a housing, a screen cage mounted in said housing and having an inner surface and an outer surface, said screen cage having a first end and a second end, a rotor mounted within said screen cage, said housing including first attachment means at said first end of said screen cage between said housing and said outer surface of said screen cage, and second attachment means at said second end of said screen cage between said housing and said outer surface of said screen cage, mounting means for mounting said first end of said screen cage on said first attachment means while providing radial clearance therebetween so as to permit radial motion of said screen cage at said first attachment means and for mounting said second end of said screen cage on said second attachment means while providing radial clearance therebetween so as to permit radial motion of said cage at said second attachment means, and axial support means for axially supporting at least one of said first and second attachment means.

2. The apparatus of claim 1 including rotation prevention means extending between at least one of said first and second attachment means and said screen cage for preventing rotation of said screen cage within said housing.

3. The apparatus of claim 1 wherein said screen cage comprises a perforated or slotted plate.

4. The apparatus of claim 1 wherein said screen cage comprises a plurality of rods, and including a plurality of support strips extending around said rods.

5. The apparatus of claim 1 including separate seal means provided in said radial clearances between said first and second attachment means and said first and second ends of said screen cage.

6. The apparatus of claim 5 wherein said first and second ends of said screen cage include groove means, and wherein said seal means are provided in said groove means.

* * * * *